United States Patent Office 2,838,499
Patented June 10, 1958

2,838,499
6-FLUORO STEROIDS AND PROCESS

George B. Spero, Kalamazoo Township, Kalamazoo County, Barney J. Magerlein, Kalamazoo, and William P. Schneider and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,499
32 Claims. (Cl. 260—239.55)

This invention relates to 1-dehydro-6-fluoro-9α-halohydrocortisone and 1-dehydro-6-fluoro-9α-halocortisone and 21-esters thereof, to intermediates in the preparation of such compounds and to processes for their production.

The compounds of this invention possess valuable antirheumatoid arthritic, anti-inflammatory and glucocorticoid activities in marked degree. Thus, for example, 1-dehydro-6α,9α-difluorohydrocortisone has been found to exhibit approximately 427 times and 1-dehydro-6α,9α-difluorohydrocortisone acetate 443 times the glucocorticoid activity of hydrocortisone. These compounds are useful in the treatment of inflammatory conditions of the skin, eyes and ears of humans and of valuable domestic animals, as well as contact dermatitis and other allergic reactions.

Compositions containing the compounds of the present invention can be prepared for animal or human use by incorporating them in any one of the several dosage forms suitable for such use. Administration of the novel steroids thus can be in conventional dosage forms, such as pills, tablets, capsules, solutions, syrups or elixirs for oral use, or in liquid forms which are adaptable to the natural and synthetic cortical steroid hormones for injectable products. The novel compounds can also be administered topically in the form of ointments, creams, lotions, and the like, with or without coacting antibiotics, germicides or other materials forming advantageous combinations therewith.

The compounds of this invention can be prepared in accordance with the following reactions:

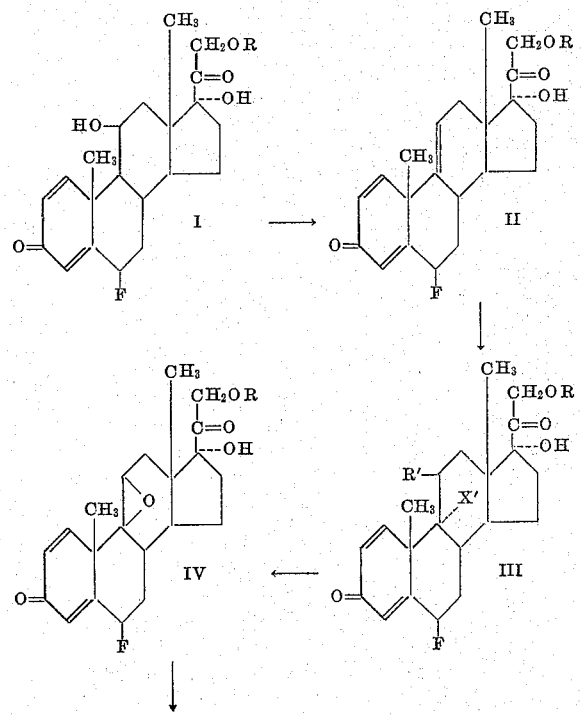

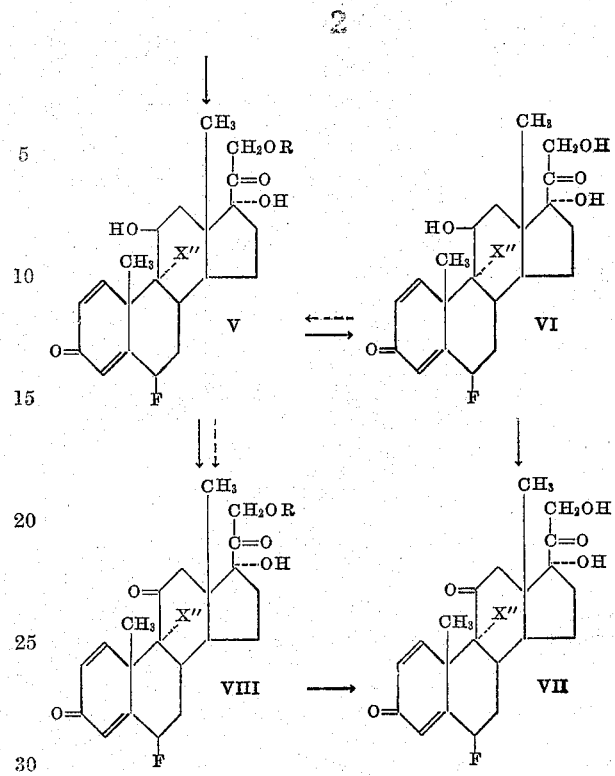

wherein R is hydrogen or the acyl radical of an organic carboxylic acid, preferably a hydrocarbon carboxylic acid, containing from one to twelve carbon atoms, inclusive, X' is bromo, chloro or iodo, and X" is fluoro, chloro or bromo.

As indicated above and described in greater detail below, the sequence of reactions embodied in the process characterizing this invention is susceptible of variation, the precise order selected being determined by such factors as economics and convenience.

It is an object of the present invention to provide 1-dehydro-6-fluoro-9α-halohydrocortisone and 1-dehydro-6-fluoro-9α-halocortisone and 21-esters thereof. Another object of this invention is to provide 1-dehydro-6α-fluoro-9α-halohydrocortisone and 1-dehydro-6α-fluoro-9α-halocortisone and their 21-esters. A further object is to provide novel intermediates in the preparation of 1-dehydro-6-fluoro-9α-halohydrocortisone and 1-dehydro-6-fluoro-9α-halocortisone and the 21-esters of each. Still another object is the provision of processes for the preparation of 1-dehydro-6-fluoro-9α-halohydrocortisone and 1-dehydro-6-fluoro-9α-halocortisone, 21-esters thereof and intermediates thereto. Additional objects will be apparent to those skilled in the art to which this invention pertains.

The process of the present invention comprises first the dehydration of 1-dehydro-6-fluorohydrocortisone 21-acylates to obtain 6-fluoro-17α,21-dihydroxy-1,4,9(11)-pregnatriene-3,20-dione 21-acylate, followed by treatment of the dehydration product with a source of hypohalous acid in which the halogen is bromine, chlorine, or iodine to produce the corresponding 6-fluoro-9α-halo-17α,21-dihydroxy-1,4-pregnadiene-3,20-dione 21-acylate. The said 9α-halo compound is then epoxidized with a mild base to give 6-fluoro-9β,11β-oxido-17α,21-dihydroxy-1,4-pregnadiene-3,20-dione 21-acylate. Halogenation of the said 9,11-oxido compound, the halogenating agent being one which provides a source of fluorine or chlorine, gives the corresponding 6-fluoro-9α-halo-17α,21-dihydroxy-1,4-pregnadiene-3,20-dione 21-acylate. Upon hydrolysis of the said 9α-halo 21-acylate there is produced 1-dehydro-6-fluoro-9α-halohydrocortisone, which can be oxidized by known methods to produce the 1-dehydro-6-fluoro-9α-halocortisones.

The starting steroid for the compounds and process of the present invention is 1-dehydro-6-fluorohydrocortisone acylate, which is prepared in accordance with the procedures of Preparations 1 through 11 herein. The preferred starting compounds containing the 17(20)-double bond have the cis configuration because they are generally convertible in higher yields in the oxidative hydroxylation step than are the trans isomers, although both are operative.

In carrying out the novel process of this invention, 1-dehydro-6-fluorohydrocortisone acylate (I) is dehydrated to the corresponding 21-acylate of 6-fluoro-17α,21-dihydroxy-1,4,9(11)-pregnatriene-3,20-dione (II) by methods known in the art, e. g., by a dehydrating agent such as phosphorous oxychloride, thionyl chloride, hydrochloric acid or sulfuric acid and acetic acid or by pyrolysis as shown in U. S. Patents 2,640,838 and 2,640,839, or the dehydration can be effected by the preferred method of reacting the 1-dehydro-6-fluorohydrocortisone acylate with a carboxylic acid N-haloamide or N-haloimide, wherein the halogen is bromine or chlorine, in an organic base together with anhydrous sulfur dioxide. Examples of such N-haloamides or N-haloimides are N-chloroacetamide, N-bromoacetamide, N-chlorosuccinimide, N-bromosuccinimide, 3-bromo-5,5-dimethylhydantoin, 1,3-dibromo-5,5-dimethylhydantoin, and the like, N-bromoacetamide being preferred. The organic bases employed as solvents in the above reaction are generally tertiary amines wherein the amino nitrogen is a member of an aromatic ring, such as the pyridines and lower fatty amides, pyridine being preferred. Normally an amount in excess of a molar equivalent of organic base calculated on the baisis of the quantity of starting steroid is employed. The sulfur dioxide is advantageously employed in substantially anhydrous form, inasmuch as the presence of water tends to decrease the yield of dehydrated product. The temperature of the reaction is generally between minus forty and plus seventy degrees centigrade, the lower limit being determined by the solubility of the substituents in the solvent selected and the upper limit by the amount of side reaction which normally accompanies reactions involving halogen compounds at higher temperatures. Ordinarily, room temperatures are preferred for convenience and because of the consistently high yields of end product which are obtained. A reaction time between about five minutes and three hours is usually employed, the specific temperature at which the reaction is conducted being determinative of the reaction time.

The thus obtained dehydration product is converted to 6 - fluoro - 9α - halo - 11β,17α,21 - trihydroxy - 1,4-pregnadiene-3,20-dione 21-acylate (III) by reaction with a hypohalous acid. The hypohalous acid is usually produced in situ by reaction of an acid with an N-haloamide or N-haloimide wherein the halogen is bromine, chlorine or iodine. The 6-fluoro-17α,21-dihydroxy-1,4,9(11)-pregnatriene-3,20-dione 21-acylate is dissolved in an organic solvent such as methylene chloride, tertiary butyl alcohol, dioxane, tertiary amyl alcohol or the like, and reacted at room temperature with the hypohalous acid releasing agent, which includes N-bromoacetamide, N-chloroacetamide, N-bromosuccinimide, N-iodosuccinimide, N-chlorosuccinimide, and the like, in the presence of an acid such as perchloric acid, dilute sulfuric acid, and the like. N-bromoacetamide in tertiary butyl alcohol with perchloric acid and water are the preferred reagents for this reaction. Normally the halogenation is conducted at room temperatures, between fifteen and thirty degrees centigrade, although temperatures on either side of this range are operative. The reaction period may vary from about five minutes to one hour. At the conclusion of the desired reaction, the excess hypohalous acid is destroyed by the addition of sulfites or hydrosulfites, sodium sulfite being normally employed. The resulting 6 - fluoro - 9α - halo - 11β,17α,21 - trihydroxy - 1,4-pregnadiene-3,20-dione 21-acylate (III), in which the halogen is bromine, chlorine or iodine, can be isolated from the reaction mixture by adding an excess of water and extracting the product with organic solvents or by recovering the precipitated compound by filtration, or the crude material (III) can be employed directly in the next step of the process.

The 9α-halo compound (III) as defined above is then epoxidized with a weak base, potassium acetate being preferred. The reaction is conducted in an inert solvent such as methanol, ethanol, acetone, and the like. The epoxidizing reaction takes place over a rather wide range of temperatures, normally from about minus fifteen degrees to the boiling point of the reaction mixture, the range between zero degrees and sixty degrees centigrade being most convenient. The reaction time may be varied considerably, depending on the temperatures employed, a period of reflux of from about eight to twenty hours producing satisfactory yields, with about eighteen hours usually being sufficient. The reaction mixture is concentrated, cooled and precipitated with water to give 6-fluoro - 9β,11β - oxido - 17α,21 - dihydroxy - 1,4-pregnadiene-3,20-dione 21-acylate (IV).

In the epoxide opening step, the 9,11-oxido compound (IV) is reacted with an acid halide such as hydrogen fluoride, hydrogen chloride or hydrogen bromide, hydrogen fluoride being preferred, to produce the corresponding 6 - fluoro - 9α - halo - 11β,17α,21 - trihydroxy - 1,4-pregnadiene-3,20-dione 21-acylate. The epoxide opening and halogenation is usually conducted at temperatures between about minus forty and plus fifty degrees centigrade, the preferred limits being between about zero and 25 degrees centigrade. Advantageously, the steroid is first dissolved in an organic solvent such as tetrahydrofuran, methylene chloride, and the like. In the course of the foregoing reaction, it is possible that some hydrolysis of the 21-acylate occurs, rendering the product somewhat difficult to recover by conventional methods, such as by chromatography. It is therefore preferable at the conclusion of the epoxide opening reaction to 21-acylate the product by methods commonly employed for acylating steroids, such as by treatment with the appropriate anhydride or acid halide of an organic carboxylic acid containing from one to twelve carbon atoms, inclusive, under conventional esterifying conditions. The halogenation reaction is operative at room temperatures but is preferably conducted at lower temperatures, such as zero to minus eighty degrees centigrade, with continuous stirring. The reaction time is usually from about one to 24 hours, with one to five hours being operative at room temperatures. After the reaction is completed, the mixture is poured into water and neutralized with a dilute base, such as dilute sodium or potassium hydroxide, or a bicarbonate such as sodium bicarbonate, potassium bicarbonate, or the like. The reaction mixture is then extracted in the usual manner, such as with methylene chloride, and the 6 - fluoro - 9α - halo - 11β,17α,21 - trihydroxy - 1,4-pregnadiene-3,20-dione 21-acylate (V) recovered in a purified form by recrystallization or chromatography.

The 6-fluoro-9α-halo-11β,17α,21-trihydroxy-1,4-pregnadiene-3,20-dione 21-acylate (V), wherein the halogen is fluorine, bromine, or chlorine, can then be hydrolyzed to the free 21-alcohol (VI) in accordance with known methods for hydrolyzing hydrocortisone 21-esters to free hydrocortisone. A preferred precodure is to employ at least a molar equivalent of an alkali metal bicarbonate, such as potassium bicarbonate, in a substantially oxygen-free solution of a mixture of a lower alkanol, such as methanol, and water. The hydrolysis reaction is normally conducted at temperatures between about ten and thirty degrees centigrade while protecting the mixture from atmospheric oxygen, generally by bubbling nitrogen continuously through the reaction mixture. After hydrolysis is complete, the mixture is neutralized with an acid such as acetic acid, dilute hydrochloric acid, or the like, and the hydrolyzed product recovered by evaporation and crystallization, extraction with a water-immiscible solvent such as methylene chloride, or by other conventional methods.

The step of hydrolysis can be followed by re-esterification of the 21-hydroxy group, as it is convenient to start with the 21-acetate as the 21-acylate and thus carry the 21-acetate through the synthesis steps. Esterification is carried out to produce the desired final 21-acylate using the appropriate anhydride or acid halide of an organic carboxylic acid containing from one to twelve carbon atoms, inclusive, preferably of a hydrocarbon carboxylic acid, under conventional 21-acylating conditions. The thus produced 6-fluoro-9α-halo-11β,17α,21-trihydroxy-1,4-pregnadiene-3,20-dione 21-acylate can be oxidized to the 11-keto compound (VIII) as described below.

The 6-fluoro-9α-halo-11β,17α,21-trihydroxy-1,4-pregnadiene-3,20-dione (VI) can be oxidized to the corrresponding 6-fluoro-9α-halo-17α,21-dihydroxy-1,4 - pregnadiene-3,11,20-trione (VII) by methods which effect a selective oxidation at the 11-position, such as the procedure described in U. S. Patent 2,751,402. In accordance with the procedure therein described, selective oxidation is accomplished by reaction of the 11β-hydroxy steroid with an N-haloamide or N-haloimide such as N-bromoacetamide in a substantially nonreactive organic solvent containing an amine, preferably tertiary butyl alcohol as the solvent and pyridine as the amine.

Alternatively, the 6-fluoro-9α-halo-11β,17α,21-trihydroxy-1,4-pregnadiene-3,20-dione 21-acylate (V), instead of being hydrolyzed as indicated above, can be first oxidized to the corresponding 11-keto compound (VIII) by known methods for converting hydrocortisone acylates to cortisone acylates, such as by reaction with chromic acid. The thus produced 6-fluoro-9α-halo-17α,21-dihydroxy-1,4-pregnadiene-3,11,20-trione 21-acylate (VIII) can then be hydrolyzed as described above for the hydrolysis of the 11β-hydroxy-21-acylated steroid to yield 6-fluoro-9α-halo-17α,21-dihydroxy-1,4-pregnadiene-3,11,20-trione (VII).

The foregoing compounds I through VIII are all characterized by the presence of a 6-fluoro substituent. It should be noted that the configuration of the fluorine at the 6-position can be either 6α or 6β. Thus substituting 6β-fluorohydrocortisone as the starting steroid (I) and following the procedures hereinbefore described and as exemplified below, while maintaining near neutral conditions, there is produced as the final product of each example the corresponding 6β-epimer. Where the 6β-epimer or mixtures predominating therein is employed as the starting material, any subsequent reaction product can be isolated either as the 6β-epimer or the aforesaid mixtures of 6α and 6β epimers, or a 6α-epimerized product can be obtained by treatment of the 6β-epimer or mixtures of 6α and 6β epimers in an essentially anhydrous liquid medium with an anhydrous mineral acid, such as hydrochloric acid, in the presence of alcohol. For the most efficient epimerization, the 6β-product should be maintained below room temperatures, preferably below zero degrees centigrade, during addition of the acid. The reaction mixture can then be washed with successive portions of dilute alkali and water and dried under reduced pressure. The corresponding 6α-product can then be purified by recrystallization.

The following preparations and examples are illustrative of the process and products of the present invention but are not to be construed as limiting.

PREPARATION 1

*3-ethylene glycol ketal of methyl 3,11-diketo-5α,6α-oxido-17(20)-[cis]-pregnen-21-oate*

To a solution of five grams of the 3-ethylene glycol ketal of methyl 3,11-diketo-4,17(20)-[cis]-pregnadien-21-oate, prepared in the manner described in U. S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade, and after two crystallizations from methanol there was obtained pure 3-ethylene glycol ketal of methyl 3,11-diketo-5α,6α-oxido-17(20)-[cis]-pregnen-21-oate melting at 206 to 209 degrees centigrade and having an $[\alpha]_D$ of plus 37 degrees ($CHCl_3$) and the following analysis:

Calculated for $C_{24}H_{32}O_6$: C, 69.20; H, 7.75. Found: C, 69.59; H, 7.81.

PREPARATION 2

*Methyl 3,11-diketo-5α,6β-dihydroxy-17(20)-allopregnen-21-oate and methyl 3,11-diketo-5α-hydroxy-6β-fluoro-17(20)-allopregnen-21-oate*

To a solution of 1.73 grams of 3-ethylene glycol ketal of methyl 3,11-diketo-5α,6α-oxido-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Purification by chromatography gave two fractions: (A) 481 milligrams eluted with methylene chloride plus five percent acetone, and (B) 921 milligrams eluted with methylene chloride plus ten and twenty percent acetone. Crystallization of fraction A from acetone-Skellysolve B hexanes gave 390 milligrams of methyl 3,11-diketo-5α-hydroxy-6β-fluoro-17(20)-allopregnen-21-oate, melting point 254 to 260 degrees centigrade. The analytical sample melted at 260 to 263 degrees centigrade.

*Analysis.*—Calculated for $C_{22}H_{29}O_5F$: F, 4.84. Found: F, 4.47.

Fraction B on crystallization from acetone-Skellysolve B hexanes gave 470 milligrams of methyl 3,11-diketo-5α,6β - dihydroxy-17(20)-allopregnen - 21 - oate, melting point 235 to 245 degrees centigrade. The analytical sample melted at 245 to 248 degrees centigrade.

*Analysis.*—Calculated for $C_{22}H_{30}O_6$: C, 67.67; H, 7.74. Found: C, 67.91; H, 7.62.

PREPARATION 3

*Methyl 3,11-diketo-5α-hydroxy - 6β - fluoro-17(20)-allopregnen-21-oate 3-ethylene ketal*

A mixture of 1.9 grams of methyl 3,11-diketo-5α-hydroxy-6β-fluoro - 17(20) - allopregnen-21-oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11-diketo-5α-hydroxy-6β-fluoro-17(20)-allopregnen-21-oate 3-ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol, is productive of the respective 3-alkylene ketals of methyl 3,11 - diketo - 5α - hydroxy - 6β - fluoro-17(20)-allopregnen-21-oate.

PREPARATION 4

*5α,11β,21 - trihydroxy - 6β - fluoro-17(20)-allopregnen-3-one 3-ethylene ketal*

To a solution of 1.96 grams of methyl 3,11-diketo-5α-hydroxy-6β-fluoro-17(20)-allopregnen-21-oate 3-ethylene ketal in 850 milliliters of anhydrous ether was added 3.7 grams of lithium aluminum hydride. The mixture was stirred for a period of one hour, and 200 milliliters of water was added slowly, the ether phase separating. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21-trihydroxy-6β-fluoro-17(20)-allopregnen-3-one 3-ethylene ketal, melting point 197 to 205 degrees centigrade. An additional 226 milligrams was obtained from the mother liquor, melting point 175 to 185 degrees centigrade.

PREPARATION 5

*5α,11β-dihydroxy - 6β - fluoro - 21 - acetoxy-17(20)-allopregnen-3-one 3-ethylene ketal*

The acetate was prepared by allowing 0.87 gram of 5α,11β,21-trihydroxy-6β-fluoro-17(20)-allopregnen-3-one 3-ethylene ketal to stand overnight in ten milliliters of acetic anhydride and ten milliliters of pyridine. The solution was then poured into ice water to give 0.92 gram of 5α,11β-dihydroxy-6β-fluoro - 21 - acetoxy-17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

Similarly, other 21-esters of 5α,11β,21-trihydroxy-6β-fluoro-17(20)-allopregnen-3-one 3-ethylene ketals can be prepared wherein the 21-acyl radical is that of a hydrocarbon carboxylic acid containing from one to twelve carbon atoms, inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, propiolic, undecylenic, succinic, crotonic, maleic, a cyclic acid, e. g., cyclopropylideneacetic, cyclopentylformic, cyclopentylacetic, β-cyclohexylpropionic, cyclohexylformic, cyclohexylacetic, an aryl or alkaryl acid, e. g., benzoic, 2-, 3- or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, cinnamic, or the like, by contacting 5α,11β,21-trihydroxy-6β-fluoro-17(20)-pregnen-3-one 3-ethylene ketal with the appropriate acylating agent, e. g., the anhydride or acid halide of the selected acid in a solvent such as benzene, toluene, acetic acid, or the like.

PREPARATION 6

*5α,11β,17α-trihydroxy-6β-fluoro-21-acetoxy-allopregnane-3,20-dione 3-ethylene ketal*

To a solution of 0.77 gram of 5α,11β-dihydroxy-6β-fluoro-21-acetoxy - 17(20) - allopregnen-3-one 3-ethylene ketal in 35 milliliters of tertiary butyl alcohol was added one milliliter of pyridine, 1.9 milliliters of N-methylmorpholine oxide peroxide solution, and 13.1 milligrams of osmium tetroxide (9.1 milliliters of tertiary butyl alcohol solution containing 1.44 milligrams of osmium tetroxide per milliliter). The solution was stirred for a period of 2.5 hours and fifteen milliliters of five percent sodium hydrosulfite was added. Stirring was continued for an additional ten minutes, at which time 0.7 gram of finely ground synthetic magnesium silicate was mixed into the solution for a period of twenty minutes and then removed by filtration. The filtrate was evaporated to dryness under reduced pressure at a temperature of less than fifty degrees centigrade. The residue was dissolved in methylene chloride, washed with water, dried and evaporated to dryness. This residue was crystallized from acetone-Skellysolve B hexanes to give 0.47 gram of 5α,11β,17α-trihydroxy - 6β - fluoro - 21 - acetoxyallopregnane-3,20-dione 3-ethylene ketal, melting point 220 to 228 degrees centigrade.

PREPARATION 7

*5α,11β,17α-trihydroxy - 6β - fluoro - 21 - acetoxyallopregnane-3,20-dione*

A solution of 0.47 gram of 5α,11β,17α-trihydroxy-6β-fluoro-21-acetoxyallopregnane-3,20-dione 3-ethylene ketal in 35 milliliters of acetone and four milliliters of 1N sulfuric acid solution was gently boiled on a steam bath for ten minutes, cooled and neutralized with dilute sodium bicarbonate solution. Addition of water followed by cooling gave 0.33 gram of 5α,11β,17α-trihydroxy-6β-fluoro-21-acetoxyallopregnane-3,20-dione, melting point 230 to 240 degrees centigrade.

PREPARATION 8

*6β-fluoro-11β,17α-dihydroxy-21-acetoxy-4-pregnene-3,20-dione (6β-fluorohydrocortisone acetate)*

A solution of 100 milligrams of 5α,11β,17α-trihydroxy-6β-fluoro-21-acetoxyallopregnane-3,20-dione in 4.9 milliliters of acetic acid and 0.1 milliliter of water was refluxed for a period of one hour, cooled, diluted with fifty milliliters of water and evaporated to dryness under reduced pressure. The residue was chromatographed over synthetic magnesium silicate to give one fraction (77 milligrams) eluted with methylene chloride plus ten percent acetone. Crystallization from acetone-Skellysolve B hexanes gave 38 milligrams of 6β-fluoro-11β,17α-dihydroxy-21-acetoxy-4-pregnene-3,20-dione (6β-fluorohydrocortisone acetate), melting point 210 to 218 degrees centigrade. Infrared data and ultraviolet data were in agreement with the structure.

Substitution of other 21-esters of 6β-fluoro-5α,11β,21-trihydroxy-17(20)-allopregnene-3-one 3-alkylene ketals, such as those enumerated in Preparation 5, in the procedure of Preparation 6, and then following the procedures of Preparations 7 and 8, is productive of the corresponding 6β-fluorohydrocortisone acylate.

PREPARATION 9

*6α-fluoro-11β,17α-dihydroxy-21-acetoxy-4-pregnene-3,20-dione (6α-fluorohydrocortisone acetate)*

A solution of 0.132 gram of 6β-fluoro-11β,17α-dihydroxy-21-acetoxy-4-pregnene-3,20-dione in twelve milliliters of chloroform and 0.1 milliliter of absolute alcohol was cooled to minus ten degrees centigrade in an ice-salt bath. A stream of anhydrous hydrochloric acid was gently bubbled through the solution for 2.5 hours, during which period the temperature was maintained between minus five and minus fifteen degrees centigrade. The solution was then diluted with 25 milliliters of chloroform, washed with diluted aqueous sodium bicarbonate solution, dried over anhydrous sodium sulfate, and evaporated to dryness under reduced pressure at sixty degrees centigrade. Crystallization of the residue from acetone-Skellysolve B hexanes gave 42 milligrams of the isomerized product, 6α - fluoro - 11β,17α-dihydroxy-21-acetoxy-4-pregnene3,20-dione, which melted at 203 to 210 degrees centigrade.

Substitution of other 6β-fluoro-21-acylates, such as those of Preparation 8, in the above procedure is productive of the corresponding 6α-epimers.

PREPARATION 10

*1-dehydro-6α-fluorohydrocortisone*

Five 100-milliliter portions of a medium, in 250-milliliter Erlenmeyer flasks, containing one percent glucose, two percent corn steep liquor (sixty percent solids) and tap water, were adjusted to a pH of 4.9. This medium was sterilized for 45 minutes at fifteen pounds per square inch pressure and inoculated with a one to two day growth of *Septomyxa affinis*, A. T. C. C. 6737. The Erlenmeyer flask was shaken at room temperature (about 26 to 28 degrees centigrade) for a period of three days. At the end of this period this 500-milliliter volume was used as an inoculum for ten liters of the same glucose-corn steep liquor medium which in addition contained ten milliliters of an antifoam compound (a mixture of lard oil and octadecanol). The fermenter was placed into the water-bath, adjusted to 28 degrees centigrade and the contents stirred (300 R. P. M.) and aerated (0.3 liter air to five liters of beer). After 24 hours of incubation, when a good growth had been developed, five grams of $6\alpha$-fluorohydrocortisone acetate plus one-half gram of 3-keto-bisnor-4-cholen-22-al, dissolved in 25 milliliters of dimethylformamide was added and the incubation carried out at the same temperature (28 degrees centigrade) and aeration for a period of 72 hours (final pH 8.3). The mycelium was filtered off and washed with water. The wash water was combined with the filtrate and the whole was extracted with three two-liter portions of a mixture of methylene-ethyl acetate 3:1). Removal of the solvent by evaporation gave 5.25 grams of crude solid which was triturated twice with four milliliters of methylene chloride to give 2.4 grams of 1-dehydro-$6\alpha$-fluorohydrocortisone of melting point 198 to 203 degrees centigrade. The analytical sample, recrystallized from acetone, melted at 202 to 204 degrees centigrade. Analysis gave $[\alpha]_D$ plus 73 degrees (dioxane) and the following:

*Analysis.*—Calculated for $C_{21}H_{27}O_5F$: C, 66.65; H, 7.10; F, 5.02. Found: C, 66.68; H, 7.19; F, 5.49.

Substitution of the $6\beta$-epimer for the starting material above is productive of 1-dehydro-$6\beta$-fluorohydrocortisone. The $6\beta$-epimer can be converted to the $6\alpha$-epimer following the procedure of Preparation 9.

PREPARATION 11

$6\alpha$ - fluoro - $11\beta,17\alpha$ - dihydroxy-21-acetoxy-1,4-pregnadiene - 3,20-dione (1-dehydro-$6\alpha$-fluoro-hydrocortisone acetate)

A solution of two grams of 1-dehydro-$6\alpha$-fluorohydrocortisone in ten milliliters of pyridine and ten milliliters of acetic anhydride was allowed to stand at room temperature for seventeen hours, and was then poured into a mixture of ice and water. The resulting crystalline product was isolated by filtration, washed with water and dried. The yield of 1-dehydro-$6\alpha$-fluorohydrocortisone acetate was 1.32 grams of melting point 232 to 237 degrees centigrade. The analytical sample melted at 238 to 242 degrees centigrade. Analysis gave $[\alpha]_D$ plus 102 degrees (acetone) and the following:

*Analysis.*—Calculated for $C_{23}H_{29}O_6F$: C, 65.70; H, 6.95; F, 4.52. Found: C, 65.58; H, 7.16; F, 4.39.

Substituting of other acylating agents for the acetic anhydride in the above procedure, such as those providing the acyl radicals indicated in Preparation 5, is productive of the corresponding 21-acylates of 1-dehydro-$6\alpha$-fluorohydrocortisone.

EXAMPLE 1

$6\alpha$-fluoro-$17\alpha$-hydroxy-21-acetoxy-1,4,9(11)-pregnatriene-3,20-dione To a solution of 1.05 grams of 1-dehydro-$6\alpha$-fluorohydrocortisone acetate in ten milliliters of pyridine was added 0.517 gram of N-bromoacetamide. The mixture was allowed to stand under nitrogen for fifteen minutes, at which time it was cooled to five degrees centigrade. While stirring, sulfur dioxide was passed over the surface until the solution gave no color change with acidified starchiodide paper. The temperature of the reaction mixture was not allowed to go above twenty degrees centigrade during the sulfur dioxide addition. The mixture was then poured into 100 milliliters of ice-water, resulting in precipitation of 977 milligrams of $6\alpha$-fluoro-$17\alpha$-hydroxy - 21 - acetoxy - 1,4,9(11) - pregnatriene - 3,20-dione, melting point 186 to 196 degrees centigrade (with decomposition). The analytical sample melted at 213 to 216 degrees centigrade (with decomposition). Analysis gave $[\alpha]_D$ plus 34 degrees (acetone) and the following:

*Analysis.*—Calculated for $C_{23}H_{27}O_5F$: C, 68.64; H, 6.76; F, 4.72. Found: C, 68.85; H, 6.86; F, 4.72.

EXAMPLE 2

$6\alpha$ - fluoro - $9\alpha$ - bromo - $11\beta,17\alpha$-dihydroxy-21-acetoxy-1,4 - pregnadiene-3,20-dione (1-dehydro-$6\alpha$-fluoro-$9\alpha$-bromohydrocortisone acetate)

To a solution of 1.27 grams of $6\alpha$-fluoro-$17\alpha$-hydroxy-21-acetoxy-1,4,9(11)-pregnatriene-3,20-dione in 19.5 milliliters of methylene chloride was added 38 milliliters of tertiary butyl alcohol, a solution of three milliliters of 72 percent perchloric acid in 22.5 milliliters of water, and a solution of 0.55 gram of N-bromoacetamide in 9.6 milliliters of tertiary butyl alcohol. After stirring for fifteen minutes, a solution of 0.55 gram of sodium sulfite in thirty milliliters of water was added and the mixture concentrated under reduced pressure at sixty degrees centigrade until crystallization occurred. After cooling in an ice bath, 100 milliliters of water was added with stirring. On filtering the crystalline product, followed by washing with water and drying, a yield of 1.59 grams of essentially pure $6\alpha$-fluoro-$9\alpha$-bromo-$11\beta,17\alpha$-dihydroxy-21-acetoxy-1,4-pregnadiene-3,20-dione, melting point 188 to 191 degrees centigrade (with decomposition) was obtained. The product was used in the succeeding example without further purification.

Substitution of N-iodosuccinimide or N-chlorosuccinimide for the N-bromoacetamide in the foregoing reaction is productive of the corresponding $9\alpha$-halo product.

EXAMPLE 3

$6\alpha$-fluoro-$9\beta,11\beta$-oxido-$17\alpha$-hydroxy-21-acetoxy-1,4-pregnadiene-3,20-dione A mixture of 1.749 grams of $6\alpha$-fluoro-$9\alpha$-bromo-$11\beta,17\alpha$ - dihydroxy - 21 - acetoxy - 1,4 - pregnadiene-3,20 - dione (1 - dehydro - $6\alpha$ - fluoro - $9\alpha$ - bromohydrocortisone acetate) 1.749 grams of potassium acetate, and fifty milliliters of acetone was stirred and heated at reflux temperature for eighteen hours. The reaction mixture was then concentrated to about one-half the original volume cooled and poured into 300 milliliters of water to give 1.303 grams of $6\alpha$-fluoro-$9\beta,11\beta$-oxido-$17\alpha$ - hydroxy - 21 - acetoxy - 1,4 - pregnadiene - 3,20-dione, melting point 234 to 238 degrees centigrade (with decomposition). The analytical sample, recrystallized from acetone, melted at 257 to 260 degrees centigrade. Analysis gave $[\alpha]_D$ plus seventy degrees (acetone) and the following:

*Analysis.*—Calculated for $C_{23}H_{27}O_6F$: C, 66.01; H, 6.50; F, 4.54. Found: C, 65.73; H, 6.58; F, 3.87.

EXAMPLE 4

$6\alpha,9\alpha$ - difluoro - $11\beta,17\alpha$ - dihydroxy - 21 - acetoxy - 1,4-pregnadiene - 3,20 - dione (1 - dehydro - $6\alpha,9\alpha$ - difluorohydrocortisone acetate)

To 5.2 grams of liquid hydrogen fluoride cooled in Dry Ice bath, was added, portion-wise, a slurry of 2.276 grams of $6\alpha$-fluoro-$9\beta,11\beta$-oxido-$17\alpha$-hydroxy-21-acetoxy-1,4-pregnadiene-3,20-dione in nine grams of tetrahydrofuran (distilled over NaOH) and 28 milliliters of methylene chloride which had similarly been cooled in a Dry Ice bath. The steroid dissolved completely. After standing at zero to five degrees centigrade for seventeen hours, the reaction mixture was poured slowly into a stirred mixture of 500 milliliters of water and 25 grams of sodium bicarbonate. The mixture was stirred for a few minutes, and the product was extracted with three 100-milliliter portions of methylene chloride. The methylene chloride solutions were washed with water, dried, and chromatographed over synthetic magnesium silicate. The fraction eluted from the column with fifteen and twenty percent acetone in Skellysolve B hexanes was recrystallized from ethyl acetate-Skellysolve B hexanes and gave 1.342 grams of 1-dehydro-6α,9α-difluorohydrocortisone acetate, melting point 238 to 242 degrees centigrade. The analytical sample melted at 239 to 242 degrees centigrade. Analysis gave $[\alpha]_D$ plus 91 degrees (acetone) and the following:

Analysis.—Calculated for $C_{23}H_{28}O_6F_2$: C, 63.00; H, 6.44; F, 8.67. Found: C, 63.23; H, 6.82; F, 8.14.

Substitution of aqueous hydrogen chloride or hydrogen bromide for the hydrogen fluoride above is productive of the corresponding 9α-chloro or 9α-bromo product, respectively.

Substitution in the procedure of Example 1 of other 21-esters of 1-dehydro-6α- or 6β-fluorohydrocortisone, such as those enumerated in Preparation 11, followed by the procedures of Examples 2 through 4 above, is productive of the corresponding 21-esters of 1-dehydro-6,9α-difluorohydrocortisone, 1-dehydro-6-fluoro-9α-chlorohydrocortisone or 1-dehydro-6-fluoro-9α-bromohydrocortisone, wherein the 6-fluoro substituent is either in the 6α or 6β configuration.

Among the 21-esters of 1-dehydro-6α,9α-difluorohydrocortisone, the following are of particular interest because of the enhanced qualities of water-solubility or prolonged pharmacological activity which they possess, such esters being specifically embraced within the present invention: 1-dehydro-6α,9α-difluorohydrocortisone 21-hemisuccinate, 1-dehydro-6α,9α-difluorohydrocortisone 21-hemiglutarate, 1 - dehydro-6α,9α-difluorohydrocortisone 21-hemi - β,β - dimethylglutarate, and 1-dehydro-6α,9α-difluorohydrocortisone 21-hemimaleate, as the free acids or as the basic salts thereof (such as the alkali metal salts, and particularly the sodium salt), the amine salts (such as diethanolamine, epinephrine, etc.), phosphate, and xanthogenate.

EXAMPLE 5

6α,9α - difluoro - 11β,17α,21 - trihydroxy-1,4-pregnadiene-3,20-dione (1-dehydro-6α,9α-difluorohydrocortisone)

Nitrogen was bubbled through a solution of 1.4 grams of 6α,9α-difluoro-11β,17α-dihydroxy,21-acetoxy-1,4-pregnadiene-3,20-dione (1-dehydro-6α,9α - difluorohydrocortisone acetate) in 140 milliliters of methanol for fifteen minutes. To this was added a solution of 1.4 grams of potassium bicarbonate in 17.5 milliliters of water likewise treated with nitrogen. After stirring under nitrogen for five hours, the base was neutralized by the addition of 1.5 milliliters of acetic acid in forty milliliters of water. The mixture was then concentrated under reduced pressure at 55 degrees centigrade until crystallization started. The slurry was then cooled in an ice bath, diluted with 100 milliliters of water, and filtered to give 0.892 gram of 6α,9α-difluoro-11β,17α,21-trihydroxy-1,4-pregnadiene-3,20-dione (1 - dehydro - 6α,9α - difluorohydrocortisone), melting point 232 to 242 degrees centigrade (with decomposition). The analytical sample melted at 250 to 257 degrees centigrade (with decomposition). Analysis gave $[\alpha]_D$ plus 84 degrees (acetone) and the following:

Analysis.—Calculated for $C_{21}H_{26}O_5F_2$: C, 63.62; H, 6.61; F, 9.59. Found: C, 62.26; H, 7.10; F, 9.41.

The 1-dehydro-6α-fluoro-9α-chlorohydrocortisone and its 9α-bromo analogue are prepared from their corresponding 21-acylates by hydrolysis in an acid-catalyzed reaction, as, for example, with methanol containing hydrochloric acid.

The 1-dehydro-6α,9α-difluorohydrocortisone of the present example or its 9α-chloro or 9α-bromo analogue can be re-esterified at the 21-position with the anhydride or acid halide of an organic carboxylic acid containing from one to twelve carbon atoms, inclusive, as previously disclosed in Preparation 11. The resulting 1-dehydro-6α,9α-difluorohydrocortisone 21-acylate or its 9α-chloro or 9α-bromo analogues can then be oxidized according to the procedure of Example 6 to produce the corresponding 21-acylates of 1-dehydro-6α,9α-difluorocortisone, 1-dehydro-6α-fluoro-9α-chlorocortisone and 1-dehydro-6α-fluoro-9α-bromocortisone, respectively.

Alternatively, the hydrolyzed 9α-fluoro, 9α-chloro and 9α-bromo products, before re-esterification, can be oxidized with an N-haloamide or N-haloimide in pyridine solution to obtain 1-dehydro-6α,9α-difluorocortisone, 1-dehydro-6α-fluoro-9α-chlorocortisone and 1-dehydro-6α-fluoro-9α-bromocortisone.

EXAMPLE 6

6α,9α-difluoro-17α-hydroxy-21-acetoxy-1,4 - pregnadiene-3,11,20-trione (1-dehydro-6α,9α-difluorocortisone acetate)

A solution is prepared containing 0.5 gram of 6α,9α-difluoro-11β,17α-dihydroxy-21-acetoxy-1,4-pregnadiene-3,20-dione (1-dehydro - 6α,9α - difluorohydrocortisone acetate) 0.15 gram of chromium trioxide, ten milliliters of glacial acetic acid and one-half milliliter of water. This mixture is stirred and maintained at room temperature for eight hours. Thereafter, the excess oxidant is destroyed by addition of methanol and the mixture is poured into fifty milliliters of ice water. The resulting precipitate is collected on a filter and recrystallized three times from ethyl acetate-Skellysolve B hexanes to give 6α,9α-difluoro-17α-hydroxy-21-acetoxy-1,4-pregnadiene-3,11,20-trione.

Similarly, the corresponding 9α-chloro and 9α-bromo starting materials can be oxidized to give 6α-fluoro-9α-chloro-17α-hydroxy-21-acetoxy-1,4-pregnadiene - 3,11,20-trione and 6α-fluoro-9α-bromo-17α-hydroxy-21-acetoxy-1,4-pregnadiene-3,11,20-trione, respectively.

EXAMPLE 7

6β-epimers

Substituting 6β-fluorohydrocortisone acetate for starting material in Preparation 10 and retaining the 6β configuration in subsequent steps by careful maintenance of near neutral reaction condition, 6β-epimers, such as 1-dehydro - 6β,9α - difluorohydrocortisone, 1 - dehydro-6β-fluoro - 9α - chlorohydrocortisone, 1 - dehydro-6β-fluoro-9α - bromohydrocortisone, 1 - dehydro - 6β,9α - difluorocortisone, 1-dehydro-6β-fluoro-9α-chlorocortisone and 1-dehydro-6β-fluoro-9α-bromocortisone, are produced. The thus obtained 6β-epimers yield the 6α-epimers by treatment with acid according to the procedure of Preparation 9.

This application is a continuation-in-part of copending application Serial Number 634,828, filed January 18, 1957, which in turn is a continuation-in-part of copending application Serial Number 519,632, filed July 1, 1955.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound of the following formula:

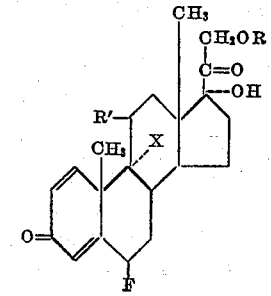

wherein R is a member selected from the group consisting of hydrogen and the acyl radical of a hydrocarbon carboxylic acid containing from one to twelve carbon atoms, inclusive, R' is a member selected from the group consisting of hydroxy and keto, and X is halogen.

2. A compound of claim 1 in which the 6-fluoro group is 6α-fluoro.

3. 1-dehydro-6α-fluoro-9α-halohydrocortisone 21-acylate, wherein the acyl group is that of a hydrocarbon carboxylic acid containing from one to twelve carbon atoms, inclusive.

4. 1-dehydro-6α,9α-difluorohydrocortisone 21-acylate, wherein the acyl group is that of a hydrocarbon carboxylic acid containing from one to twelve carbon atoms, inclusive.

5. 1-dehydro-6β,9α-difluorohydrocortisone 21-acylate, wherein the acyl group is that of a hydrocarbon carboxylic acid containing from one to twelve carbon atoms, inclusive.

6. 1-dehydro-6α,9α-difluorohydrocortisone.
7. 1-dehydro-6α,9α-difluorohydrocortisone acetate.
8. 1-dehydro-6β,9α-difluorohydrocortisone acetate.
9. 1-hehydro-6α,9α-difluorohydrocortisone 21-sodium hemisuccinate.
10. 1-dehydro-6α,9α-difluorohydrocortisone 21-sodium hemiglutarate.
11. 1-hehydro-6α,9α-difluorohydrocortisone 21-sodium hemi-β,β-dimethylglutarate.
12. 1-dehydro-6α,9α-difluorohydrocortisone 21-sodium hemimaleate.
13. 1-dehydro-6α-fluoro-9α-bromohydrocortisone.
14. 1-dehydro-6α-fluoro-9α-halocortisone 21-acylate, wherein the acyl group is that of hydrocarbon carboxylic acid containing from one to twelve carbon atoms, inclusive.
15. 1-dehydro-6β,9α-difluorocortisone acetate.
16. 1-dehydro-6α,9α-difluorocortisone.
17. 1-dehydro-6α,9α-difluorocortisone acetate.
18. A compound of the following formula:

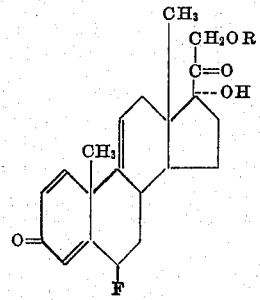

wherein R is a member selected from the group consisting of hydrogen and the acyl radical of a hydrocarbon carboxylic acid containing from one to twelve carbon atoms, inclusive.

19. 6α-fluoro-17α,21-dihydroxy-1,4,9(11)-pregnatriene-3,20-dione.

20. A compound of the following formula:

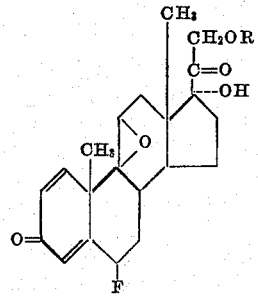

wherein R is a member selected from the group consisting of hydrogen and the acyl radical of a hydrocarbon carboxylic acid containing from one to twelve carbon atoms, inclusive.

21. 6α-fluoro-17α,21-dihydroxy-9β,11β-oxido-1,4-pregnadiene-3,20-dione.

22. A process for the production of a compound of the following formula:

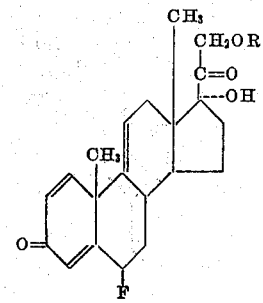

wherein R is a member selected from the group consisting of hydrogen and the acyl radical of an organic carboxylic acid containing from one to twelve carbon atoms, inclusive, which comprises: dehydrating 6-fluorohydrocortisone 21-acylate, wherein the acyl radical is defined as above.

23. A process for the production of a compound of the following formula:

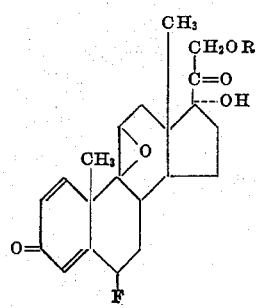

wherein R is a member selected from the group consisting of hydrogen and the acyl radical of an organic carboxylic acid containing from one to twelve carbon atoms, inclusive, which comprises: reacting 6-fluoro-17α,21-dihydroxy-1,4,9(11)-pregnatriene-3,20-dione 21-acylate with a source of hypohalous acid wherein the halogen of the said acid is a member selected from the group consisting of bromine, chlorine and iodine to obtain the corresponding 6-fluoro-9α-halo-11β,17α,21-trihydroxy-1,4-pregnadiene-3,20-dione 21-acylate, and expoxidizing the said 9α-halo compound with a mild base.

24. A process for the production of a compound of the following formula:

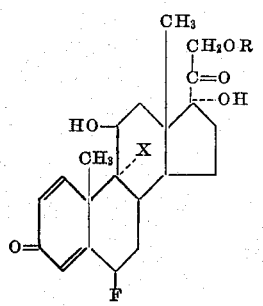

wherein R is a member selected from the group consisting of hydrogen and the acyl radical of an organic carboxylic acid containing from one to twelve carbon atoms, inclusive, and X is a member selected from the group consisting of fluorine, chlorine and bromine, which comprises: reacting 6-fluoro-9β-11β-oxido-17α,21-dihydroxy 1,4-pregnadiene-3,20-dione 21-acylate, wherein the acyl group is defined as above, with a halogenating agent providing a source of a halogen selected from the group consisting of fluorine, chlorine and bromine.

25. The process of claim 24 wherein the 6-fluoro substituent is 6α-fluoro.

26. The process of claim 25 wherein the halogenating agent is hydrogen fluoride.

27. A process for the production of a compound of the following formula:

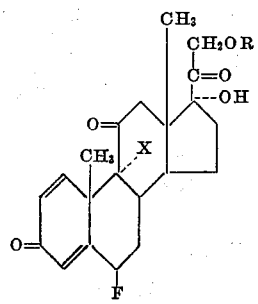

wherein R is a member selected from the group consisting of hydrogen and the acyl radical of an organic carboxylic acid containing from one to twelve carbon atoms, inclusive, and X is a member selected from the group consisting of fluorine, chlorine and bromine, which comprises: oxidizing 6-fluoro-9α-halo-11β,17α,21-trihydroxy-1,4-pregnadiene-3,20-dione 21-acylate, wherein the halo and acyl substituents are defined as above, with an oxidizing agent.

28. The process of claim 27 wherein the 6-fluoro substituent is 6α-fluoro.

29. A process for the production of 1-dehydro-6-fluoro-9α-halohydrocortisone which comprises reacting a 1-dehydro-6-fluoro-9α-halohydrocortisone acylate with a hydrolyzing agent.

30. A process for the production of 1-dehydro-6α,9α-difluorohydrocortisone which comprises reacting a 1-dehydro-6α,9α-difluorohydrocortisone acylate with an alkali metal bicarbonate hydrolyzing agent.

31. A process for the production of 1-dehydro-6-fluoro-9α-halocortisone which comprises reacting a 1-dehydro-6-fluoro-9α-halocortisone acylate with a hydrolyzing agent.

32. A process for the production of 1-dehydro-6α,9α-difluorocortisone which comprises hydrolyzing a 1-dehydro-6α,9α-difluorocortisone acylate with an alkali metal bicarbonate.

References Cited in the file of this patent
UNITED STATES PATENTS

| | | |
|---|---|---|
| 2,783,226 | Gould et al. | Feb. 26, 1957 |
| 2,816,902 | Gould et al. | Dec. 17, 1957 |
| 2,819,264 | Gould et al. | Jan. 7, 1958 |